United States Patent [19]

Seydl

[11] 3,947,421

[45] Mar. 30, 1976

[54] SELF-EXTINGUISHING POLYESTER MOLDING COMPOSITIONS

[75] Inventor: Wolfgang Seydl, Frankenthal, Germany

[73] Assignee: BASF Aktiengesellschaft, Ludwigshafen (Rhine), Germany

[22] Filed: Jan. 17, 1974

[21] Appl. No.: 434,271

[30] Foreign Application Priority Data

Jan. 19, 1973 Germany.............................. 2302583

[52] U.S. Cl.... 260/40 R; 260/45.7 R; 260/45.75 R; 260/DIG. 24
[51] Int. Cl.$^2$.......................................... C08K 3/34
[58] Field of Search.... 260/40 R, DIG. 24, 45.75 R, 260/45.7 R

[56] References Cited
UNITED STATES PATENTS

| | | | |
|---|---|---|---|
| 2,681,899 | 6/1954 | Crawford et al. | 260/45.7 R |
| 3,297,616 | 1/1967 | Fisher et al. | 260/45.7 R X |
| 3,434,980 | 3/1969 | Stastny et al. | 260/45.7 R X |
| 3,624,024 | 11/1971 | Caldwell | 260/40 R |
| 3,751,396 | 8/1973 | Gall | 260/40 R |

FOREIGN PATENTS OR APPLICATIONS 879,151  8/1971  Canada............................ 260/40 R

OTHER PUBLICATIONS

S. Oliesky & J. Mohr, *Handbook of Reinforced Plastics*, 1964, p. 172.

Primary Examiner—Donald E. Czaja
Assistant Examiner—S. M. Person
Attorney, Agent, or Firm—Johnston, Keil, Thompson & Shurtleff

[57] ABSTRACT

Self-extinguishing molding compositions based on polybutylene terephthalate which do not drip flaming particles on exposure to a flame and which contain a compound containing halogen, which is stable under the conditions required for processing the melt, and a synergistically active metal compound, are obtained by incorporation of a magnesium silicate of the chrysotile type into the polycondensate.

4 Claims, No Drawings

SELF-EXTINGUISHING POLYESTER MOLDING COMPOSITIONS

The invention relates to self-extinguishing polyester molding compositions, based on polybutylene terephthalate, which do not drip flaming particles on exposure to a flame.

Polybutylene terephthalate has substantial advantages, as an injection molding composition, over other polyesters which can be processed by thermoplastic methods such as, for examples, polyethylene terephthalate. In particular, polybutylene terephthalate is substantially simpler to injection-mold than is polyethylene terephthalate. In addition, injection moldings produced from polybutylene terephthalate have outstanding mechanical properties, such as toughness, stiffness and surface hardness.

However, it is a disadvantage of polybutylene terephthalate moldings that on contact with a flame they burn very sootily. On exposure to an open flame the material melts with decomposition and flaming particles are dripped, which can cause the fire to spread. The test specimen itself sometimes continues to burn after removal of the flame.

In particular, this is true if the molding contains reinforcing materials such as glass fibers or mineral fillers such as chalk, asbestos or talc.

However, in numerous fields, the possible applications of moldings are essentially determined by the flammability rating of the particular material. Thus it is demanded that after removing the flame moldings should not continue to burn but should become extinguished and resist the spread of a fire. The use of polybutylene terephthalate moldings in numerous fields such as, say, electrical engineering or household appliances is thus closely linked to the problem of fire hazard. As a result, there exists a need to manufacture polybutylene terephthalate moldings of which the flammability rating does not imply the disadvantages mentioned.

It is the object of the present invention to modify polybutylene terephthalate or provide it with flame-retardant additives, so that the moldings produced therefrom are self-extinguishing and "non-dripping." Self-extinguishing in the present context means that immediately after, or shortly after, taking away the flame with which the test specimens have been heated and ignited, the specimens do not continue to burn and the flame does not spread. "Non-dripping" means, in the present context, that during or after exposure of a vertically fixed test specimen to the flame, no molten polyester particles are released.

It is particularly this requirement which is important in assessing the flammability of thermoplastics.

We have found, surprisingly, that the object of providing polybutylene terephthalate molding compositions which are self-extinguishing and do not drip flaming particles on exposure to a flame is achieved if the molding compositions contain, based on the amount of polyester, 3 to 25 per cent by weight of a compound containing halogen, which is stable under the conditions of processing the melt, 3 to 15 per cent by weight of synergistically active metal compound and 1 to 15 per cent by weight, preferably 3 to 8 per cent by weight, of a magnesium silicate of the chrysotile type.

It is extremely surprising that the molding compositions obtainable according to the invention display the desired properties since experiments have shown that even if large quantities of organic halogen compounds in combination with synergistically active metal compounds are added, but without the magnesium of the chrysotile type which is to be employed according to the invention, polybutylene terephthalate moldings which are both self-extinguishing and do not drip flaming particles are not obtained (comparative Experiment A).

Hence, these molding compositions do not conform to the stipulations of the flammability tests, since they drip flaming or hot polyester particles and therefore do not effectively prevent the spread of a fire. The effect achieved according to the invention is also surprising since the addition of reinforcing agents such as glass fibers or mineral fillers such as chalk, asbestos and talc to polybutylene terephthalate substantially increases the rate of burning of molding compositions provided with this additive, as compared to unmodified polybutylene terephthalate moldings. Furthermore, this effect is also surprising since the presence of other magnesium silicates instead of chrysotile, which is to be used according to the invention, does not give molding compositions having the advantageous properties which have been mentioned (comparative Experiments C and D). The use of small quantities of chrysotile furthermore has the effect that the amount of flame-retardant additives required for an effective flame-retardant modification of polybutylene terephthalate moldings can be reduced considerably.

Halogen compounds which can be used for flameproofing are above all compounds containing chlorine or bromine which are heat-stable at the temperatures at which the polybutylene terephthalate is processed and which only decompose at the scorching temperatures of polybutylene terephthalate. The following compounds have proved particularly suitable for the purpose of the present invention and are therefore preferred:

1. Chlorinated and brominated diphenyls and triphenyls containing 40 to approx. 85% by weight of halogen, such as hexachlorodiphenyl, decachlorodiphenyl, hexabromodiphenyl, octabromodiphenyl.

2. Chlorinated and brominated diphenyl ethers such as pentabromodiphenyl ether, octabromodiphenyl ether and decabromodiphenyl ether.

The following halogen compounds are also suitable:

1. Tetrachloro- and tetrabromo-phthalic anhydride.
2. Diels-Alder adducts of 2 moles of hexachlorocyclopentadiene and 1 mole of cyclopentadiene, furan, dicyclopentadiene and cyclooctadiene-1,5 and adduct of 1 mole of hexachlorocyclopentadiene and 1 mole of tetrabromostyrene.
3. Chlorinated or brominated bisphenol A and bisphenol S and tetrabromo-bisphenol A and their functional derivatives.
4. Brominated and chlorinated aromatics such as, say, hexabromobenzene and pentabromotoluene.

Synergistically active metal compounds which can be used are above all antimony compounds, preferably antimony trioxide, and also compounds of tin, iron, lead, zinc, bismuth and copper, preferably in the form of the oxides.

The polyester molding compositions according to the invention contain polybutylene terephthalate which can be modified with up to 20 mole% of other dicarboxylic acids or alcohols. Possible modifiers are, for example, aliphatic dicarboxylic acids of up to 20 C and cycloaliphatic or aromatic dicarboxylic acids with 1 or 2 aromatic rings. Examples of these are adipic acid, sebacic acid, cyclohexanedicarboxylic acid, isophthalic acid, 2,6-naphthalenedicarboxylic acid and 2,7-naphthalenedicarboxylic acid.

Possible alcoholic modifiers are in particular aliphatic and cycloaliphatic glycols of 2 to 10 C, such as ethylene glycol, propylene glycol, hexanediol-1,6, neopentyl glycol, diethylene glycol and 1,4-bis-hydroxymethylcyclohexane.

To improve the properties it can also be desirable to co-condense small quantities of trifunctional and polyfunctional crosslinking substances such as trimethylolpropane or trimesic acid into the polybutylene terephthalate.

In addition to the additives according to the invention, the self-extinguishing polyester molding compositions can contain further additives such as dyes, pigments, stabilizers against thermal, thermo-oxidative and ultra-violet degradation, antistatic agents, lubricants and processing auxiliaries which ensure trouble-free extrusion and injection molding, provided these additives do not influence the flame retardancy.

The polybutylene terephthalate employed for the manufacture of the molding compositions according to the invention usually has a relative viscosity of 1.3 to 1.8, preferably 1.5 to 1.7. The relative viscosity was determined in 0.5% strength solution in a phenol/o-dichlorobenzene mixture (3:2), using an Ubbelohde viscometer.

The molding compositions according to the invention possess good processing properties and excellent mechanical properties, such as toughness and stiffness and surface hardness, and are suitable for the manufacture of moldings used, for example, in electrical engineering, in mechanical engineering and instrumentmaking and for domestic appliances.

The additives according to the invention are incorporated into the polybutylene terephthalate by conventional processes for mixing solid constituents with thermoplastics, using an extruder, an injection molding machine and the like. Preferably, the self-extinguishing polybutylene terephthalate moldings are manufactured by mixing granular polybutylene terephthalate with the additives mentioned, subsequently melting and homogenizing the mixture in an extruder, extruding it into a water bath, and granulating and drying it.

An alternative method is to introduce the additives into the condensation apparatus immediately after completion of the polycondensation.

The burning characteristics were tested on groups of 10 barshaped injection moldings in the as-received condition and after 7 days' storage at 70°C. Essential features, if the specimen is to withstand the tests and achieve classification SE 0 or SE 1, are not only that the burning times should be as short as possible but also that during and after exposure to the flame the test bar should not drip flaming particles. With regard to the classifications, compare H. Reymer's "New flammability indexes: what they are, what they means", Modern Plastics, October 1970, Pages 92 et seq.).

The burning test was carried out on moldings 12.7 cm long, 1.2 cm wide and 0.16 cm thick. The test specimens are fixed vertically in a clamp and were ignited by means of a 2 cm high nonluminous Bunsen burner flame which as located immediately below the test specimen, the distance between the lower edge of the test specimen and the upper end of the Bunsen burner tube being 1 cm. After exposure to the flame for 10 seconds, the Bunsen burner was removed and the duration of glowing combustion was measured. After the specimen had become extinguished, it was again ignited for 10 seconds and the period of glowing combustion was measured with a stop-watch. Observations were also made as to whether the polyester test bar dripped flaming particles.

The burning times were obtained as the mean value from the 20 flame exposures carried out on 10 test bars; for classification SE 0 the burning time must be less than 5 seconds and the burning after a single ignition must not last longer than 10 seconds, whilst for classification SE 1 the burning time must be between 25 seconds and a maximum of 30 seconds in the case of a single ignition. In addition, the specimen must not drip flaming polyester particles.

EXPERIMENTS AND COMPARATIVE EXPERIMENTS

EXAMPLE 1

3.5 kg of granular polybutylene terephthalate having a relative viscosity of 1.65 were thoroughly mixed with 350 g of octabromodiphenyl, 175 g of antimony trioxide and 140 g of chrysotile (composition: 40.1% $SiO_2$; 40.8% MgO; 0.6% $Al_2O_3$; 0.2% CaO; 1.7% total iron) the mixture was fused and homogenized in an extruder, and the extruded material was granulated after passing through a water bath. The test specimens required for the flammability testing were then produced on an injection molding machine.

| | |
|---|---|
| Flammability test (as-received condition): | |
| Burning time: | 2.2 seconds |
| Dripping of flaming particles: | none |
| Classification: | SE 0 |
| Flammability test (after 7 days' storage at 70°C): | |
| Burning time: | 1.0 second |
| Dripping of flaming particles: | none |
| Classification: | SE 0 |

COMPARATIVE EXPERIMENT A 3.5 kg of polybutylene terephthalate (relative viscosity = 1.65), 525 g of octabromodiphenyl and 350 g of antimony trioxide were mixed, extruded and converted into test specimens, as described in Example 1. It was not possible to test the flammability by the method described above since the samples, both in the as-received condition and after heat treatment (7 days/70°C) in every case dripped flaming particles of polyester melt whilst the test specimens were being ignited.

COMPARATIVE EXPERIMENTS B – D

Polybutylene terephthalate granules (3.0 kg; relative viscosity = 1.65) were mixed with 300 g of octabromodiphenyl, 180 g of antimony trioxide and 150 b of a magnesium silicate, using a chrysotile of the composition described in Example 1 for Experiment B, a magnesium silicate of the composition 45.5% $SiO_2$, 18.7 MgO, 10.1% $Al_2O_3$, 7.0% CaO and 7.4% (total) Fe for Experiment C, and a magnesium silicate with 62.5% SiO$_2$, 31.5% MgO and 0.3% CaO for Experiment D. These mixtures were extruded and after granulation and drying test specimens were molded.

| Experiment B | |
|---|---|
| Flammability test (as-received condition): | |
| Burning time: | 4.9 seconds |
| Dripping of flaming particles: | none |
| Classification: | SE 0 |
| Flammability test (after 7 days' storage at 70°C): | |
| Burning time: | 4.4 seconds |
| Dripping of flaming particles: | none |
| Classification: | SE 0 |
| Experiment C | |
| Flammability test (as-received condition): | |
| Burning time: | 2.7 seconds |
| Dripping of flaming particles: | yes |
| Classification: | SE 2 |
| Experiment D | |
| Flammability test (as-received condition): | |
| Burning time: | 7 seconds |
| Dripping of flaming particles: | yes |
| Classification: | SE 2 |

EXAMPLE 2

A mixture of 3.5 kg of polybutylene terephthalate granules, 437 g of an adduct of hexachlorocyclopentadiene and cyclooctadiene-1,5, 245 g of antimony trioxide and 262 g of chrysotile containing 40.1% SiO$_2$ and 40.8% MgO was extruded and used to injection-mold test bars, as described in Example 1.

| Flammability test (as-received condition): | |
|---|---|
| Burning time: | 7.9 seconds |
| Dripping of flaming particles: | none |
| Classification: | SE 1 |
| Flammability test (after 7 days' storage at 70°C): | |
| Burning time: | 3.6 seconds |
| Dripping of flaming particles: | none |
| Classification: | SE 0 |

EXAMPLE 3

3.5 kg of polybutylene terephthalate, relative viscosity = 1.65, 315 g of decabromodiphenyl, 175 g of antimony trioxide and 175 g of chrysotile (for composition, see Example 1) were thoroughly mixed and extruded, and test specimens were injected-molded.

| Flammability test (as-received condition): | |
|---|---|
| Burning time: | 2.3 seconds |
| Dripping of flaming particles: | none |
| Classification: | SE 0 |
| Flammability test (after 7 days' storage at 70°C): | |
| Burning time: | 1.8 seconds |
| Dripping of flaming particles: | none |
| Classification: | SE 0 |

EXAMPLE 4

A mixture of 3.5 kg of polybutylene terephthalate, relative viscosity = 1.65, 420 g of octabromodphenyl ether, 175 of antimony trioxide and 175 g of chrysotile (composition as in Example 1) was extruded and used to injection-mold test specimens.

| Flammability test (as-received condition): | |
|---|---|
| Burning time: | 0.8 seconds |
| Dripping of flaming particles: | none |
| Classification: | SE 0 |
| Flammability test (after 7 days' storage at 70°C): | |
| Burning time: | 4.7 seconds |
| Dripping of flaming particles: | none |
| Classification: | SE 0 |

I claim:
1. Self-extinguishing molding compositions based on polybutylene terephthalate, which do not drip flaming particles on exposure to a flame, and which consists essentially of:
   A. 3 to 25 percent by weight of a compound containing halogen, which is stable under the conditions of processing the melt;
   B. 3 to 15 percent by weight of a synergistically active metal compound; and
   C. 1 to 15 percent by weight of a magnesium silicate of the chrysotile type having the composition: 40.1% SlO$_2$; 40.8% MgO; 0.6% Al$_2$O$_3$; 0.2% CaO; 1.7% total iron;
the percentages by weight of components A, B and C being based on the amount of polycondensate used.

2. A self-extinguishing molding composition based on polybutylene terephthalate, which does not drip flaming particles on exposure to a flame and which consists essentially of a mixture consisting of a mixture consisting of:
   A. 3 to 25 percent by weight of a compound containing halogen, which is stable under the conditions of processing the melt;
   B. 3 to 15 percent by weight of a synergistically active metal compound; and
   C. 1 to 15 percent by weight of a magnesium silicate of the chrysotile type having the composition: 40.1% Sl0$_2$; 40.8% MgO; 0.6% Al$_2$O$_3$; 0.2% CaO; 1.7% total iron;
the percentages by weight of components A, B and C being based on the amount of polycondensate used.

3. Molding compositions as claimed in claim 1, wherein the compounds containing halogen which are stable under the conditions of processing the melt consist of chlorinated and brominated diphenyls and triphenyls containing from 40 to approx. 80 percent by weight of halogen, or chlorinated and brominated diphenyl ethers.

4. Molding compositions as claimed in claim 1, wherein the synergistically active metal compound is antimony trioxide.

* * * * *